United States Patent
Huang

(10) Patent No.: US 9,621,745 B2
(45) Date of Patent: Apr. 11, 2017

(54) PROCESSING SYSTEM AND METHOD FOR THE SCANNING CONTENT

(71) Applicants: Inventec Appliances (Pudong) Corporation, Shanghai (CN); INVENTEC APPLIANCES (SHANGHAI) CO.,LTD., Shanghai (CN); Inventec Appliances (Nanchang) Corporation, Jiangxi (CN)

(72) Inventor: Li Huang, Jiangxi (CN)

(73) Assignees: Inventec Appliances (Pudong) Corporation, Shanghai (CN); Inventec Appliances (Shanghai) Co., Ltd., Shanghai (CN); Inventec Appliances (Nanchang) Corporation, Jiangxi (CN)

( * ) Notice: Subject to any disclaimer, the term of this patent is extended or adjusted under 35 U.S.C. 154(b) by 0 days.

(21) Appl. No.: 14/303,057

(22) Filed: Jun. 12, 2014

(65) Prior Publication Data

US 2014/0376062 A1    Dec. 25, 2014

(30) Foreign Application Priority Data

Jun. 19, 2013 (CN) .......................... 2013 1 0244761

(51) Int. Cl.
*H04N 1/32* (2006.01)
*H04N 1/00* (2006.01)

(52) U.S. Cl.
CPC . *H04N 1/00244* (2013.01); *H04N 2201/0068* (2013.01); *H04N 2201/0081* (2013.01); *H04N 2201/3243* (2013.01)

(58) Field of Classification Search
CPC ........... H04N 1/00803; H04N 1/00244; H04N 2201/0068; H04N 2201/0081; H04N 2201/3243
USPC ....................... 358/442, 474, 468, 1.15, 1.16
See application file for complete search history.

(56) References Cited

U.S. PATENT DOCUMENTS

| | | | | |
|---|---|---|---|---|
| 5,272,764 A * | 12/1993 | Bloomberg | .............. | G06K 9/20 358/453 |
| 6,351,559 B1 * | 2/2002 | Zhou | .................... | G06K 9/2054 382/175 |
| 6,535,897 B1 * | 3/2003 | Altman | .............. | G06K 9/00442 715/203 |
| 6,816,277 B2 * | 11/2004 | Kaltenecker | .......... | G06F 3/1206 358/1.15 |
| 8,228,522 B2 * | 7/2012 | Hirabayashi | ...... | G06F 17/30011 358/1.14 |

(Continued)

*Primary Examiner* — Cheukfan Lee
(74) *Attorney, Agent, or Firm* — Muncy, Geissler, Olds & Lowe, P.C.

(57) ABSTRACT

The present invention discloses a processing system and method for the scanning content. The processing system for the scanning content includes a scanning device and a cloud processing device. The scanning device scans the image of the non-electronic paper to generate a paper image and retrieves a selected content image corresponding to the selected content from the paper image. The cloud processing device analyzes the selected content image to correspondingly generate a content type, obtains a processing mode table which stores a plurality of content types and processing means corresponding to each content type, determines which content type in the processing mode table the generated content type belongs to and executes the processing means corresponding to the content type.

11 Claims, 3 Drawing Sheets

(56) References Cited

U.S. PATENT DOCUMENTS

| | | | |
|---|---|---|---|
| 2006/0080276 A1* | 4/2006 | Suzuki | G06F 17/241 |
| 2011/0235128 A1* | 9/2011 | Sisco | 358/3.28 |
| 2012/0170849 A1* | 7/2012 | Saka | G06K 9/346 |
| | | | 382/195 |
| 2015/0093031 A1* | 4/2015 | Konishi | G06K 9/00442 |
| | | | 382/190 |

* cited by examiner

PROCESSING SYSTEM AND METHOD FOR THE SCANNING CONTENT

CROSS-REFERENCE TO RELATED APPLICATION

This application claims the benefit of China Patent Application No. 201310244761.7, filed on Jun. 19, 2013, in the State Intellectual Property Office, the disclosure of which is incorporated herein its entirety by reference.

BACKGROUND OF THE INVENTION

1. Field of the Invention

The present invention relates to a processing system and method for the scanning content, in particular with respect to processing system and method for the scanning content are applicable to extract a scanned content by scanning a non-electronic content and conducting performing corresponding task according to the scanned content.

2. Description of the Related Art

Whenever encountering terminology, unknown vocabulary, important address or telephone number while reading non-electronic printed books, people usually get used to circle or underline them and check out the written words one by one when finishing the reading. However, the processing method seems to be time-consuming and of complexity.

In terms of the current solution, the papers are transformed into electronic document before being read and the desirable content is selected to make the corresponding process by electronic operation. Nonetheless, the method concerns transforming the printed pages into electronic document. Namely, it means that user needs to read and select the desire content via the electronic document that does not correspond with the reading habit of normal user. Furthermore, the selected underlined printed pages that the user makes are not suitable for the current solution.

Therefore, the inventor of the present invention has considered and then designed a processing system and method for the scanning content which aims at overcoming the current shortcoming so as to promote the industrial applicability.

SUMMARY OF THE INVENTION

In view of the problem of the prior art, one of the objectives of the present invention is to provide a processing system and method for the scanning content to resolve the defect that printed pages are needed to transform into electronic document such that the desirable content is selected to make the corresponding process.

According to the aforementioned objective, the present invention provides a processing system and method for the scanning content comprising a scanning device and a cloud device. The scanning device scans an area on a non-electronic object to obtain a scanned image; and an extracting module is configured to extract scanned content from the image. The cloud device is configured to communicate with the scanning device, and comprises an analyzing module configured to analyze the scanned content to determine a content type; and a processing module is configured to conduct performing a task corresponding to the content type.

In an embodiment of the system, the scanning element is configured to scan the area which is selected or scan and select the area; the cloud device further comprises a storage module for storing a plurality of task tables respectively corresponding to ways of selecting the area; the analyzing module is configured to analyze the scanned content to determine one of the ways in which the area has been selected; and the processing module is configured to conduct performing the task in one of the task tables corresponding to the determined way. Under the circumstance of the above embodiment, if the content type is not found in the task table, the processing module is configured to transmit a warning message to the scanning device.

In an embodiment of the system, the processing module is configured to conduct performing the task to produce a result, which is then stored in the cloud device or transmitted to the scanning device.

Additionally, the present invention provides a scanning device for processing scanned content and configured to communicate with a cloud device, the scanning device comprising a scanning element for scanning an area on a non-electronic object to obtain a scanned image; and an extracting module configured to extract scanned content from the image; wherein the scanning device is configured to transmit the scanned content to the cloud device for analyzing the scanned content to determine a content type and conducting performing a task corresponding to the content type. Under the circumstance of the above embodiment, if the task corresponding to the content type is not found in the cloud device, the scanning device is configured to receive a warning message from the cloud device.

Furthermore, the present invention provides a cloud device being applicable for processing scanned content generated by a scanning device, wherein the scanning device is for scanning an area on a non-electronic object to obtain a scanned image and configured to extract the scanned content from the image, and the cloud device comprises an analyzing module configured to analyze the scanned content to determine a content type; and a processing module configured to conduct performing a task corresponding to the content type.

In an embodiment of the cloud device, the cloud device comprises a storage module for storing a plurality of task tables respectively corresponding to ways of selecting the area; wherein the analyzing module is configured to analyze the scanned content to determine one of the ways in which the area has been selected, and the processing module is configured to conduct performing the task in one of the task tables corresponding to the determined way. Under the circumstance of the above embodiment, if the task corresponding to the content type is not found in the cloud device, the scanning device is configured to receive a warning message from the cloud device.

Additionally, the present invention provides a method for processing scanned content comprising a scanning device scanning an area on a non-electronic object to obtain a scanned image; extracting scanned content from the scanned image and transmitting the scanned content to a cloud device; the cloud device analyzing the scanned content to determine a content type; and the cloud device conducting performing a task corresponding to the content type.

In an embodiment of the method, the scanning step comprises a scanning element of the scanning device scanning the area which is selected or scanning and selecting the area. Under the circumstance of the above embodiment, a storage device of the cloud device is for storing a plurality of task tables respectively corresponding to ways of selecting the area.

In an embodiment of the method, the step of conducting performing the task comprises the cloud device conducting performing the task to produce a result. Under the circumstance of the above embodiment, the cloud device transmits the result to the scanning device.

DETAILED DESCRIPTION OF THE PREFERRED EMBODIMENTS

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

Figure 1:
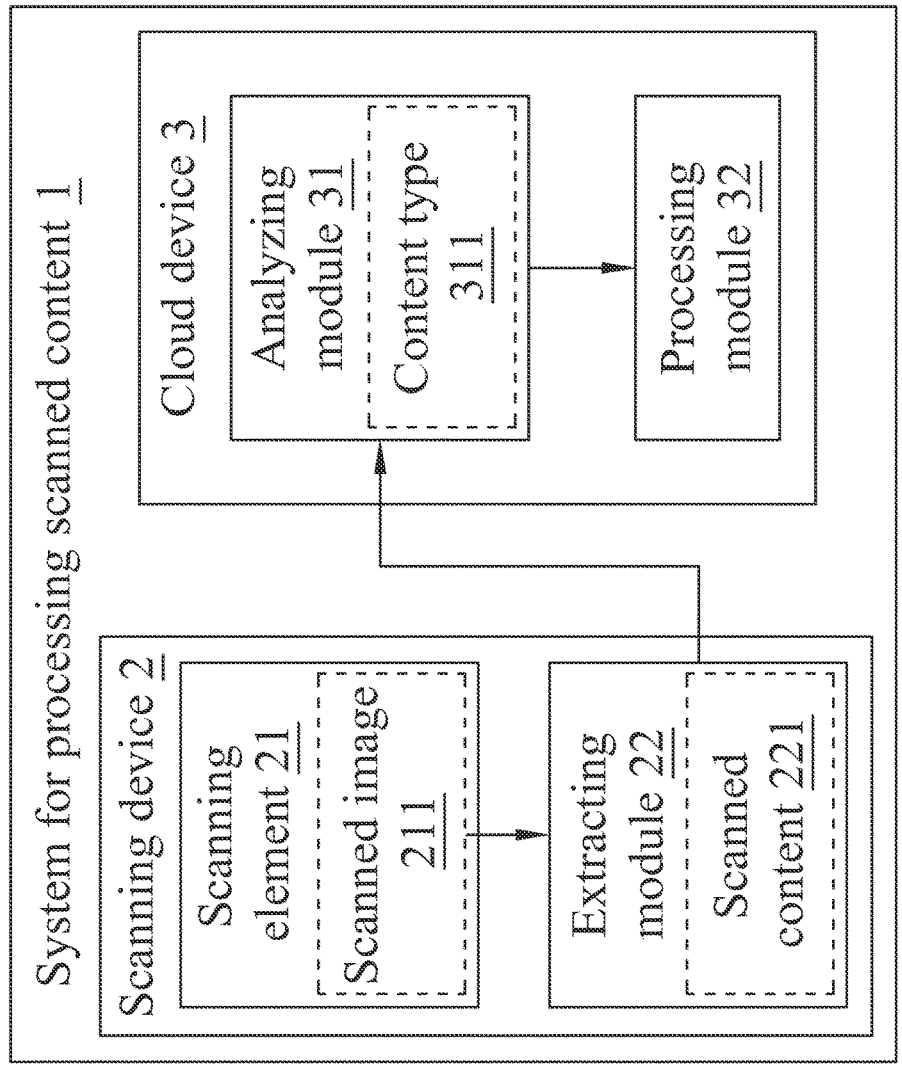
FIG. 1 is a block diagram of a processing system for the scanning content of the present invention.

Please refer to FIG. 1 which is a block diagram of a processing system for the scanning content of the present invention. As the FIG. shows that a processing system and method for the scanning content 1 of the present invention comprises a scanning device 2 and a cloud device 3. The scanning device 2 comprises a scanning module or a scanning element 21 and an image processing module or an extracting module 22. The cloud device 3 comprises and an analyzing module 31 and a processing module 21. While the processing system 1 for the scanning content of the present invention is being used, the scanning element 21 scans a non-electronic content or object to generate a content image or a scanned image 211, wherein the scanned content of the non-electronic object is the content of straight baseline, wavy baseline, fluorescent mark, circle or more than two combinations thereof made by the user; or the scanning element is configured to scan the area which is selected or scan and select the area. The extracting module 22 is configured to extract the selected content image or the scanned image 211 corresponding to the selected content from the scanned image 211. The scanned content 221 will be transmitted to the cloud device 3. The analyzing module 31 of the cloud device 3 is configured to analyze the selected scanned content 221 and then determines which content type 311 the selected scanned content 221 belongs to. In addition, the cloud device 3 of the present embodiment comprises a storage module for storing a processing mode table or a plurality of task tables (not shown in FIG.), each task table is stored a plurality of content types 311 and respectively correspond to ways or tasks of the content types 311, when the processing module 32 determines the content type 311 generated by the analyzing module 31 corresponding to one of content types 311 of the task tables, the task corresponding to the content type 311 will be conducted.

Figure 2:
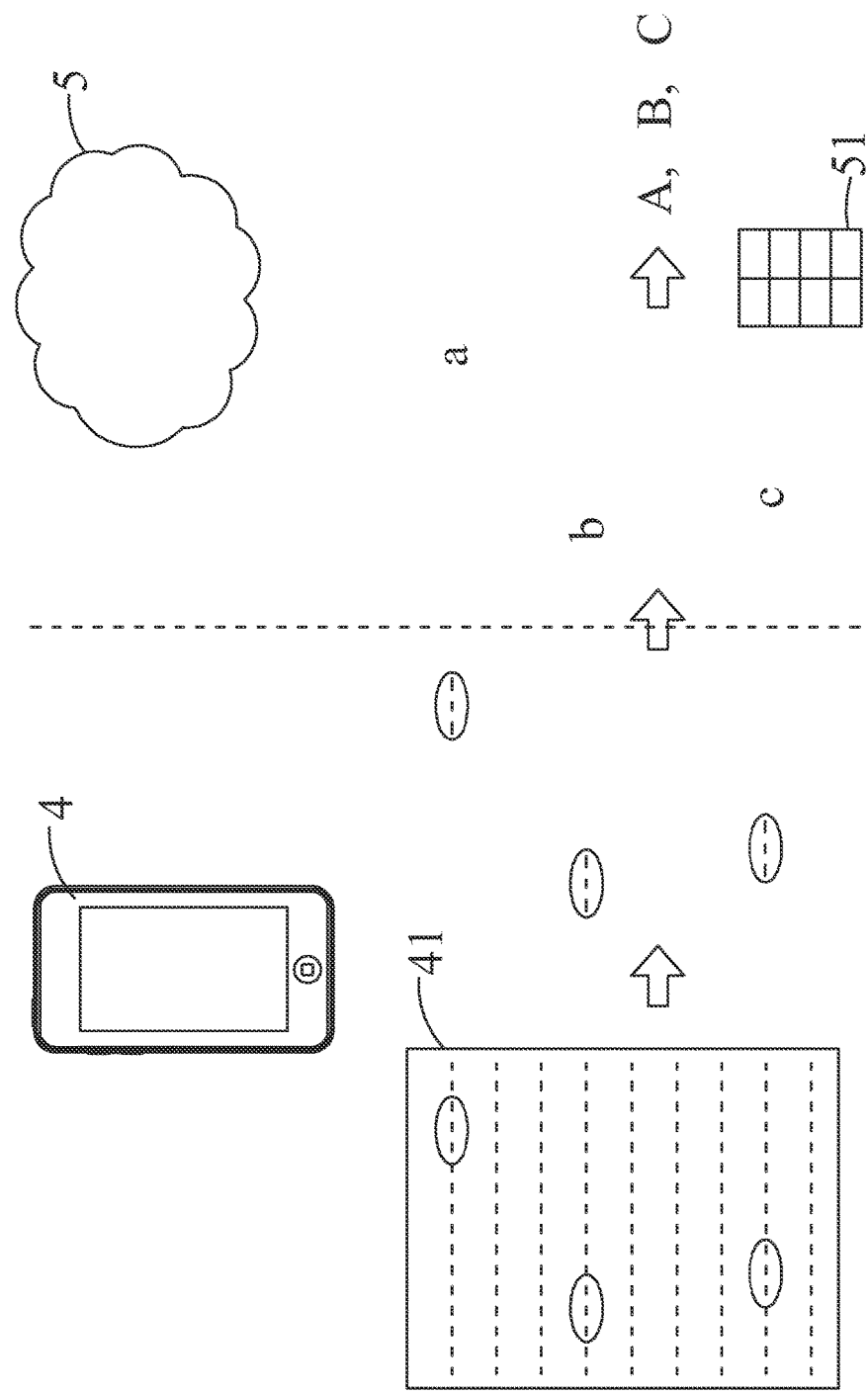
FIG. 2 is a schematic diagram of an embodiment of a processing system for the scanning content of the present invention.

Please refer to FIG. 2 along with table 1; FIG. 2 is a schematic diagram of an embodiment of a processing system for the scanning content of the present invention. To make it convenient for describing, the processing system for the scanning content of the present invention will be explained with the more practical exemplary explanation as follows. The processing system for the scanning content of the present invention comprises smartphone 4 and cloud server 5 functioning scanning and image processing, wherein the smartphone 4 and the cloud server 5 are respectively exampled as the scanning device 2 and the cloud device 3, but it shall not be subject to this restriction. When the user circles to generate the selected content on the printed pages 42, it can conduct scanning to the printed pages 41 by the smartphone 4 and extract the scanned content to transmit to the cloud server 5. The cloud server 5 stores the task tables, i.e. table 1, the table 1 stores a plurality of content types and tasks corresponding to the content types. When the cloud server 5 receives the scanned content transmitted by the smartphone 4, it will determine which the content type it belongs to obtain the task corresponding to the content type to conduct the task according to the table 1. As the table shows, the user circles three selected content on the object 41, the smartphone 4 conducts scanning the printed pages 41 and extracts the three scanned content to transmit to the cloud server 5, and the cloud server 5 determines that the three scanned content individually belong to a, b and c of the content type listed in the table 1; namely, the three scanned content respectively belongs to telephone number, terminology and English vocabulary, and separately conducts task A, B and C according to the table 1, that is, storing the telephone number to address book, inquiring Wild and translating the English vocabulary into Chinese.

TABLE 1

| Content type | Processing ways or tasks |
| --- | --- |
| Telephone number (a) | Storing the telephone number to the address book (A) |
| Terminology (b) | Inquiring Wiki (B) |
| English vocabulary (c) | Translating the English vocabulary into Chinese (C) |
| Web address | Connecting to the page of the web address |
| Skype account | Storing the Skype account |
| Address | Storing the address |

Please refer to FIG. 2 along with tables 2, 3 and 4. In another embodiment, the cloud server 5 stores a plurality of task tables, i.e. tables 2, 3 and 4 corresponding to different selected ways, respectively. Namely, table 2 corresponds to circling, table 3 corresponds to underlining and table 4 corresponds to fluorescent mark. As the FIG. shows, when the three selected content of the object 41 is generated by circling, underlining and fluorescent mark made by the user, the cloud server 5 determines the selected ways and respectively checks the corresponding tables 2, 3 and 4. By corresponding different selected ways to different task table, it can accelerate the cloud server 5 checking the task table to determine the working time so as to promote the efficiency of processing the scanned content of the present invention.

TABLE 2

| Selecting way | Content type | Processing ways or tasks |
| --- | --- | --- |
| Circling | Telephone number | Storing the telephone number to the address book |
| | Terminology | Inquiring Wiki |

TABLE 3

| Selecting way | Content type | Processing ways or tasks |
| --- | --- | --- |
| Underlining | English vocabulary | Translating the English vocabulary into Chinese |
| | Web address | Connecting to the page of the web address |

TABLE 4

| Selecting way | Content type | Processing ways or tasks |
| --- | --- | --- |
| Fluorescent mark | Skype account address | Storing the Skype account Storing the address |

By the way, the processing result or conducted result generated by the cloud server 5 enables the user storing the results in the cloud server 5 or the smartphone 4 selectively. For example, when the cloud server 5 translates the English vocabulary of the selected result into Chinese, the English vocabulary and the translated Chinese can be stored in the cloud server 5, and in the smartphone 4, too. Additionally, when the content type of the selected content selected by the user does not belong to any of the content types listed in the task tables, that is, the cloud server 5 disenables to determine that the selected content selected by the user belongs to which task tables, so that the cloud server 5 will transmit a prompting information or a warning message to the smartphone 5 to remind the user of whether adding a content type, or doing nothing towards the selected content.

Although the drawings and description are to be regarded as illustrative in nature and not restrictive as well as explain the concept of the processing system and method for the scanning content of the present invention; to make it convenient for describing, flow chart of clear explanation will be illustrated additionally.

Figure 3:
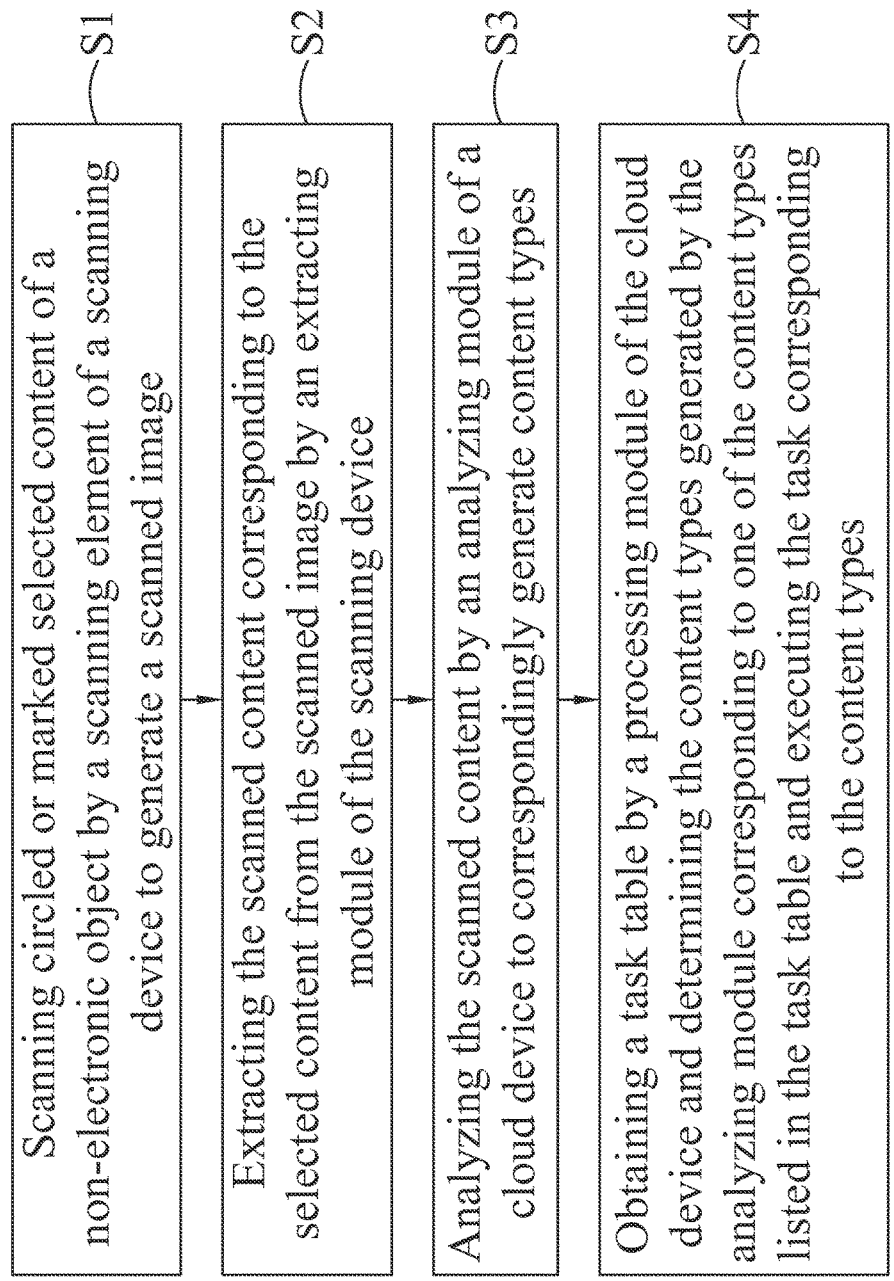
FIG. 3 is a flow chart of a processing method for the scanning content of the present invention.

Please refer to FIG. 3 which is a flow chart of an embodiment of a processing method for the scanning content of the present invention. As the FIG. shows, the processing method for the scanning content of the embodiment comprises the following steps:

Step 1. Scanning circled or marked selected content of a non-electronic object by a scanning element of a scanning device to generate a scanned image Step 2. Extracting the scanned content corresponding to the selected content from the scanned image by an extracting module of the scanning device Step 3. Analyzing the scanned content by an analyzing module of a cloud device to correspondingly generate content type Step 4. Obtaining a task table by a processing module of the cloud device and determining the content type generated by the analyzing module corresponding to one content type listed in the task table and executing the task corresponding to the content type Wherein, a plurality of content types and tasks respectively corresponding to each content type are stored in the task table.

Summarily, the processing method for the scanning content of the present invention comprises the following steps: a scanning device scanning an area on a non-electronic object to obtain a scanned image; extracting scanned content from the scanned image and transmitting the scanned content to a cloud device; the cloud device analyzing the scanned content to determine a content type; and the cloud device conducting performing a task corresponding to the content type.

In an embodiment, the extracting step is performed by an extracting module of the scanning device.

In an embodiment, the scanning step comprises a scanning element of the scanning device scanning the area which is selected or scanning and selecting the area. In the embodiment, wherein a storage device of the cloud device is configured to store a plurality of task tables respectively corresponding to ways of selecting the area, the step of conducting performing the task comprises: conducting performing the task in one of the task tables corresponding to a determined way in which the area has been selected, the method further comprises the following step: if the content type is not found in the task table, the cloud device transmits a warning message to the scanning device; or in the embodiment, the analyzing step comprises: analyzing the scanned content to determine a way in which the area has been selected.

In an embodiment, the step of conducting performing the task comprises the cloud device conducting performing the task to produce a result; in the embodiment, the method further comprises the cloud device transmitting the result to the scanning device.

In addition, the present invention also provides a scanning device for processing the scanned content and is configured to communicate with a cloud device, and the scanning device comprises a scanning element and an extracting module. The scanning element scans an area on a non-electronic object to obtain a scanned image; the extracting module is configured to extract scanned content from the image. The scanning device is configured to transmit the scanned content to the cloud device, and the cloud device is configured to analyze the scanned content to determine a content type and is configured to conduct performing the task corresponding to the content type.

In an embodiment, the scanning element is configured to scan the area which is selected or scan and select the area.

In an embodiment, if the content type is not found in the task table, the processing module is configured to transmit a warning message to the scanning device.

Additionally, the present invention also provides a cloud device which is applicable for processing scanned content generated by a scanning device, wherein the scanning device is for scanning an area on a non-electronic object to obtain a scanned image and configured to extract the scanned content from the image, and the cloud device comprises: an analyzing module configured to analyze the scanned content to determine a content type; and a processing module configured to conduct performing a task corresponding to the content type.

In an embodiment, the cloud device further comprises a storage module for storing a plurality of task tables respectively corresponding to ways of selecting the area; wherein the analyzing module is configured to analyze the scanned content to determine one of the ways in which the area has been selected, and the processing module is configured to conduct performing the task in one of the task tables corresponding to the determined way.

In the embodiment, if the content type is not found in task table, the processing module is configured to transmit a warning message to the scanning device.

In an embodiment, the processing module is configured to conduct performing the task to produce a result, which is then stored in the cloud device or transmitted to the scanning device.

In an embodiment of a processing system and method for the scanning content, it may have one or more following advantages:

(1) The processing system and method for the scanning content is suitable for non-electronic content or object, and it can circle or make the content without transforming the non-electronic content into paper object which leads to a faster and simpler processing procedure.

(2) The processing system and method for the scanning content enables the circled or marked content of the printed pages or object inputting to the cloud processing device wholly and conducts corresponding processing ways or tasks, so that the user needn't input the circled or marked content manually which contributes to the usage.

In summary, the primary spirit of the present invention is to enable user circling or making on content without transforming non-electronic object into electronic document and to quickly input the marked content to the a cloud device by scanning and then the input content can thereby be automatically classified and processed; consequently, in the prerequisite of conduct reading or circling on non-electronic object, it can promote reading and processing efficiency greatly.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A system for processing scanned content, comprising:
    a scanning device comprising:
        a scanning element for scanning an area on a non-electronic object to obtain a scanned image; and
        an extracting module configured to extract scanned content from the image; and
    a cloud device configured to communicate with the scanning device, and comprising:
        an analyzing module configured to analyze the scanned content to determine a content type; and
        a processing module configured to conduct performing a task corresponding to the content type;
    wherein the scanning element is configured to scan the area which is selected or scan and select the area; the cloud device further comprises a storage module for storing a plurality of task tables corresponding to ways of selecting the area respectively and each way of selecting the area comprises a predetermined content type; the analyzing module is configured to analyze the scanned content to determine one of the ways in which the area has been selected; and the processing module is configured to conduct performing the task in one of the plurality of task tables corresponding to the determined way, and
    wherein if the content type is not found in the one of the plurality of task tables, the processing module is configured to transmit a warning message to the scanning device.

2. The system of claim 1, wherein the processing module is configured to conduct performing the task to produce a result, which is then stored in the cloud device or transmitted to the scanning device.

3. A scanning device for processing scanned content and configured to communicate with a cloud device, the scanning device comprising:
    a scanning element for scanning an area on a non-electronic object to obtain a scanned image; and
    an extracting module configured to extract scanned content from the image;
    wherein the cloud device further comprises a storage module for storing a plurality of task tables respectively corresponding to ways of selecting the area respectively and each way of selecting the area comprises a predetermined content type, the scanning device is configured to transmit the scanned content to the cloud device for analyzing the scanned content to determine a content type and conducting performing a task corresponding to the content type;
    wherein if the task corresponding to the content type is not found in the cloud device, the scanning device is configured to receive a warning message from the cloud device.

4. The scanning device of claim 3, wherein the scanning element is configured to scan the area which is selected or scan and select the area.

5. A cloud device applicable for processing scanned content generated by a scanning device, wherein the scanning device is for scanning an area on a non-electronic object to obtain a scanned image and configured to extract the scanned content from the image, and the cloud device comprises:
    an analyzing module configured to analyze the scanned content to determine a content type;
    a processing module configured to conduct performing a task corresponding to the content type, and
    a storage module configured to store a plurality of task tables corresponding to ways of selecting the area respectively and each way of selecting the area comprises a predetermined content type; wherein the analyzing module is configured to analyze the scanned content to determine one of the ways in which the area has been selected, and the processing module is configured to conduct performing the task in one of the plurality of task tables corresponding to the determined way,
    wherein if the content type is not found in the one of the plurality of task tables, the processing module is configured to transmit a warning message to the scanning device.

6. The cloud device of claim 5, wherein the processing module is configured to conduct performing the task to produce a result, which is then stored in the cloud device or transmitted to the scanning device.

7. A method for processing scanned content, comprising:
    a scanning device scanning an area on a non-electronic object to obtain a scanned image, and a scanning element of the scanning device scanning the area which is selected or scanning and selecting the area;
    extracting scanned content from the scanned image and transmitting the scanned content to a cloud device;
    the cloud device analyzing the scanned content to determine a content type; and
    the cloud device conducting performing a task corresponding to the content type;
    wherein a storage device of the cloud device is for storing a plurality of task tables corresponding to ways of selecting the area respectively and each way of selecting the area comprises a predetermined content type, and conducting performing the task in one of the plurality of task tables corresponding to a determined way in which the area has been selected; wherein if the content type is not found in the one of the plurality of task tables, the cloud device transmits a warning message to the scanning device.

8. The method of claim 7, wherein extracting the scanned content from the scanned image is performed by an extracting module of the scanning device.

9. The method of claim 7, wherein analyzing the scanned content comprises:
    analyzing the scanned content to determine a way in which the area has been selected.

10. The method of claim 7, wherein conducting performing the task comprises the cloud device conducting performing the task to produce a result.

11. The method of claim 10, further comprising the cloud device transmitting the result to the scanning device.

* * * * *